US012722330B2

(12) United States Patent
Ventenat et al.

(10) Patent No.: US 12,722,330 B2
(45) **Date of Patent: *Sep. 1, 2026**

(54) METHOD FOR OBTAINING AN ARTICLE FORMED OF A THERMOPLASTIC MATRIX WITH TWO MELTING TEMPERATURES

(71) Applicants: DECATHLON, Villeneuve d'Ascq (FR); DEMGY GROUP, Saint Aubin sur Gaillon (FR)

(72) Inventors: Vincent Ventenat, Villeneuve d'Ascq (FR); Ophélie Westphal, Saint Aubin sur Gaillon (FR); Léo Mary, Saint Aubin sur Gaillon (FR)

(73) Assignees: DECATHLON, Villeneuve d'Ascq (FR); DEMGY GROUP, Saint Aubin sur Gaillon (FR)

( * ) Notice: Subject to any disclaimer, the term of this patent is extended or adjusted under 35 U.S.C. 154(b) by 214 days.

This patent is subject to a terminal disclaimer.

(21) Appl. No.: 18/576,684

(22) PCT Filed: Jul. 8, 2022

(86) PCT No.: PCT/EP2022/069173

§ 371 (c)(1),
(2) Date: Jan. 4, 2024

(87) PCT Pub. No.: WO2023/281096

PCT Pub. Date: Jan. 12, 2023

(65) Prior Publication Data

US 2024/0326300 A1 Oct. 3, 2024

(30) Foreign Application Priority Data

Jul. 8, 2021 (FR) ................................ FR 2107420

(51) Int. Cl.

| | |
|---|---|
| ***B29C 43/00*** | (2006.01) |
| ***B29K 105/16*** | (2006.01) |
| ***B29K 105/26*** | (2006.01) |
| ***B29K 407/00*** | (2006.01) |
| ***B29L 31/50*** | (2006.01) |

(52) U.S. Cl.

CPC ........ *B29C 43/003* (2013.01); *B29K 2105/16* (2013.01); *B29K 2105/26* (2013.01); *B29K 2407/00* (2013.01); *B29L 2031/50* (2013.01)

(58) Field of Classification Search

CPC ..... B29C 70/34; B29C 48/0011; B29C 43/44; B29C 43/34; B29C 43/184; B29C 2043/147; B29C 43/006; B29C 2949/3051; B29C 2949/3048; B29C 51/02; B29C 51/00; B29C 51/165; B29C 43/003

See application file for complete search history.

(56) References Cited

U.S. PATENT DOCUMENTS

| | | | |
|---|---|---|---|
| 10,426,229 | B2 | 10/2019 | Krause |
| 2010/0293814 | A1 | 11/2010 | Skaja et al. |

FOREIGN PATENT DOCUMENTS

| | | | |
|---|---|---|---|
| CA | 0578500 | * | 1/1994 |
| EP | 3786353 | A1 | 3/2021 |
| FR | 3011501 | A1 | 4/2015 |
| FR | 3096270 | A1 | 11/2020 |
| GB | 2456177 | A | 7/2009 |

OTHER PUBLICATIONS

International Search Report for Application No. PCT/EP2022/069173, dated Oct. 28, 2022.

* cited by examiner

*Primary Examiner* — Stella K Yi
(74) *Attorney, Agent, or Firm* — MARSHALL, GERSTEIN & BORUN LLP

(57) ABSTRACT

The invention relates to a method for obtaining an article formed of a thermoplastic matrix, said method providing for formulating inputs comprising at least one source of thermoplastic material and at least one source of filler; mixing and grinding said inputs; thermocompressing said ground mixture to obtain the article; the source of thermoplastic material being formulated so as to comprise a quantity QLM of thermoplastic material LM having a melting temperature TLM below 150° C. and a quantity QHM of thermoplastic material HM having a melting temperature THM above 180° C., the thermocompression temperature being higher than the melting temperature TLM.

17 Claims, No Drawings

METHOD FOR OBTAINING AN ARTICLE FORMED OF A THERMOPLASTIC MATRIX WITH TWO MELTING TEMPERATURES

CROSS-REFERENCE TO RELATED APPLICATION

This present application is the US national phase of International Patent Application No. PCT/EP2022/069173, filed Jul. 8, 2022 which claims priority to French Application No. FR 2107420, filed Jul. 8, 2021. The priority application, FR 2107420, is hereby incorporated by reference in its entirety.

FIELD OF THE DISCLOSURE

The invention concerns a method for obtaining an article formed of a thermoplastic matrix.

BACKGROUND

It applies in particular to the manufacture of sporting articles, in particular shoe components such as soles, but also to the manufacture of accessories for sporting activities, for example of the type described in document FR-3 096 270.

Such articles are typically obtained by formulating a mixture comprising a thermoplastic material which is injected into a mold to the desired shape, said mixture possibly comprising fillers designed to improve the properties of the articles, particularly mechanical and/or visual.

However, injecting the mixture requires prior heating thereof, which can be a limiting factor when said mixture comprises various sources of materials with, in particular, heterogeneous melting temperatures.

In particular, this limitation is all the more problematic when a material source comprises components of articles to be recycled, in particular components made of different materials that are not sorted prior to their recycling.

DETAILED DESCRIPTION

The aim of the invention is to improve the prior art by proposing in particular a method for obtaining an article formed of a thermoplastic matrix in which the materials used can be formulated extensively, in order in particular to be able to integrate therein components from unsorted articles to be recycled, and thus while obtaining an article with especially mechanical and/or visual properties that are expected for the considered application.

To this end, the invention proposes a method for obtaining an article formed of a thermoplastic matrix, said method providing for:

- formulating inputs comprising at least one source of thermoplastic material and at least one source of filler;
- mixing and grinding said inputs;
- thermocompressing said ground mixture to obtain the article;

the source of thermoplastic material being formulated so as to comprise a quantity QLM of thermoplastic material LM having a melting temperature TLM lower than 150° C. and a quantity QHM of thermoplastic material HM having a melting temperature THM higher than 180° C., the thermocompression temperature being higher than the melting temperature TLM.

Further features and advantages of the invention will become apparent from the following description, made with reference to various embodiments.

A method is described hereinbelow for obtaining an article formed of a thermoplastic matrix, said article being intended in particular for use in sport.

According to a preferred application, the method enables the production of shoe components, in particular shoe soles, for example cleated soles for practicing soccer.

According to a further considered application, the method can be used to obtain accessories for sports activities, for example in the form of cones or milestones as described in document FR-3 096 270.

Depending on the considered application, the article must have specific mechanical properties, in particular of rigidity and of resistance to abrasion, as well as possibly some visual characteristics that need to be respected.

To do this, the method provides for formulating inputs comprising at least one source of thermoplastic material and at least one source of filler, said filler being chosen in relation to the source of thermoplastic material to obtain the properties expected for the article.

To obtain the article, the inputs are mixed and ground before being thermocompressed. In particular, the thermocompression used, unlike injection molding, does not require prior heating of the inputs, the cohesion of the article being ensured by the temperature and pressure used during said thermocompression.

In particular, at least a part of the inputs are ground to present an average grind size of between 3 and 10 mm. Alternatively, at least a part of the inputs can be ground by micronization to present an average grind size of less than 1 mm.

The source of thermoplastic material is formulated so as to comprise a quantity QLM of thermoplastic material LM having a melting temperature TLM lower than 150° C. and a quantity QHM of thermoplastic material HM having a melting temperature THM higher than 180° C., the thermocompression temperature being higher than the melting temperature TLM.

Thus, during thermocompression, at least the quantity QLM of thermoplastic material LM is melted, thus guaranteeing the cohesion of the article, while the quantity QHM of thermoplastic material HM makes it possible to provide rigidity to the thermocompressed article. In particular, the source of thermoplastic material can therefore be formulated to introduce the amount of HM material required to achieve the rigidity expected for the article.

According to an advantageous embodiment, the thermocompression temperature is lower than or equal to the melting temperature THM, which allows to optimize the contribution in rigidity of the HM thermoplastic material.

In particular, the thermoplastic material LM has a lower Shore A hardness than the Shore A hardness of the thermoplastic material HM, whereby the Shore A hardness of the thermoplastic material LM can be between 50 and 60 and the Shore A hardness of the thermoplastic material HM can be between 90 and 110.

The thermoplastic material used may in particular comprise a TPU polyurethane, with a melting temperature TLM of between 150° C. and 165° C., and a melting temperature THM of between 220° C. and 235° C.

For thermocompression, the ground mixture is introduced between a punch and a die of a thermocompression mold at a temperature below the melting temperature TLM, in particular below 100° C. In particular, the ground mixture is thus in solid form so as not to melt the inputs prior to thermocompression.

The mold is then heated to a temperature between TLM and THM, and then the thermocompression pressure is applied before cooling to recover the article. In particular, the mold temperature can be lowered to a preheating temperature that lies between ambient temperature and the melting temperature TLM, in particular below 100° C., so that the ground mixture of the next article can be introduced into the mold at this temperature to save cycle time.

In one embodiment example, the ground mixture is introduced at ambient temperature between the punch and the thermocompression die, and the assembly is heated at a rate of around 1 to 5° C./min, until reaching a temperature of between TLM and THM, in particular just below THM. A pressure of around 5 to 8 bar is then applied for 5 to 10 minutes, before cooling at a rate similar to that of the temperature rise.

In one embodiment, the geometry between the punch and the die is configured to thermocompress the ground mixture to the shape of the article. Alternatively, the ground mixture can be thermocompressed in the form of a plate, the article then being shaped by molding said plate.

According to one embodiment, in particular implemented in relation to obtaining accessories for sports practice, the inputs are formulated to present a mass ratio of at most 0.5 between the HM thermoplastic material and the LM thermoplastic material, in order to obtain a flexible article.

In particular, the mass ratio of HM thermoplastic material to LM thermoplastic material can be in the order of 0.25.

According to a further embodiment, particularly implemented in relation to obtaining shoe soles, the inputs are formulated to have a mass ratio of at least 2 between the thermoplastic material HM and the thermoplastic material LM, in order to obtain a rigid article.

Preferably, the source of thermoplastic material comprises articles or components of articles to be recycled comprising at least one thermoplastic material, said source being able to be formulated exclusively with recycling or supplemented with new thermoplastic material depending on the articles to be obtained.

In particular, the source of thermoplastic material can include articles to be recycled which are similar to those obtained by implementing the method, as well as components in the form of scrap from the manufacture of such articles.

Preferably, the thermoplastic material comprises TPU polyurethane, e.g. from recycled shoe soles, and/or LDPE low-density polyethylene, e.g. from recycled sports accessories.

Generally speaking, the thermoplastic material may comprise a thermoplastic elastomer (TPE), such as thermoplastic polyurethane (TPU), or be based on polyvinyl chloride (PVC). Alternatively, a thermoplastic material used can be from the high-density polyethylene (HDPE) family.

According to a preferred embodiment, the source of thermoplastic material comprises components of footwear articles to be recycled, in particular at least the soles of said footwear articles. In particular, the footwear articles to be recycled may have an upper comprising a thermoplastic material LM and a sole based on thermoplastic material HM.

In particular, this design enables shoes comprising a textile upper knitted with polyester yarns and reinforced with TPU LM to be recycled optimally and without the need for prior sorting, while the sole of the shoe is made of TPU HM in a percentage by weight typically of 25% polyester, 25% TPU LM and 50% TPU HM.

Similarly, the source of filler comprises articles or components of articles to be recycled, in particular articles of clothing or footwear or accessories comprising at least one filler material, said source being able to be formulated exclusively with recycling or supplemented with at least one new filler material depending on the articles to be obtained.

In particular, the source of filler can comprise components of articles to be recycled which are derived from manufacturing scrap of such articles.

In one embodiment, the source of filler comprises at least one textile material, said textile material being based on polyester, polyamide, aramid, polypropylene or a blend of at least two of these polymers.

The amount of textile used is adjusted to obtain the properties expected for the article. In particular, the inputs comprise between 10% and 30% by weight of textile material, given that an increase in the quantity of textile material induces an increase in the rigidity of the article obtained.

According to one embodiment, particularly implemented in relation to obtaining accessories for sports practice, the inputs are formulated to present a mass ratio of at most 0.4 between the textile material and the thermoplastic material, in order to obtain a flexible article.

In particular, the mass ratio between the textile filler material and the thermoplastic material is 0.3.

According to a further embodiment, particularly implemented in relation to obtaining shoe soles, the inputs are formulated to have a mass ratio of at least 0.5 between the textile material and the thermoplastic material, in order to obtain a rigid article.

According to an advantageous implementation, the method enables textile materials comprising yarns and/or fibers formed from at least two different materials, for example elastane added to one of the above-mentioned polymers, to be recycled as a filler, said recycling not requiring prior separation of the different materials, which are ground together in a suitable quantity to form the filler.

In one example of embodiment, a polyester textile comprising 3 to 5% by weight of elastane is recycled to obtain an article, for example by providing around 10% of textile material in the inputs, the textile source being able to come from socks and/or seamless knitwear to be recycled.

According to another embodiment, the source of filler comprises at least one latex, the inputs comprising between 10% and 25% by weight of latex and possibly also comprising a textile material as described above. In particular, this embodiment makes it possible to recycle soccer goalkeeper gloves which comprise latex among other materials, said gloves being able to be ground together in a suitable quantity to form the filler.

In one example, the inputs comprise between 10% and 50% by weight of thermoplastic material LM, between 10% and 30% by weight of textile material, between 10% and 25% by weight of latex, the remainder being thermoplastic material HM.

What is claimed is:

1. A method for obtaining an article formed of a thermoplastic matrix, said method providing for:

formulating inputs comprising at least one source of thermoplastic material and at least one source of filler;

mixing and grinding said inputs;

thermocompressing said ground mixture to obtain the article;

said method being characterized in that the source of thermoplastic material is formulated so as to comprise a quantity QLM of thermoplastic material LM having a melting temperature TLM lower than 150° C. and a quantity QHM of thermoplastic material HM having a melting temperature THM higher than 180° C., the thermocompression temperature being higher than the melting temperature TLM.

2. The method according to claim 1, wherein the thermocompression temperature is less than or equal to the melting temperature THM.

3. The method according to claim 1, wherein the inputs are formulated to have a mass ratio of at most 0.5 between thermoplastic material HM and thermoplastic material LM, in order to obtain a flexible article.

4. The method according to claim 3, wherein the mass ratio of HM thermoplastic material to LM thermoplastic material is 0.25.

5. The method according to claim 1, wherein the inputs are formulated to have a mass ratio of at least 2 between thermoplastic material HM and thermoplastic material LM, in order to obtain a rigid article.

6. The method according claim 1, the source of thermoplastic material comprises articles or components of articles to be recycled comprising at least one thermoplastic material.

7. The method according to claim 6, wherein the source of thermoplastic material comprises components of footwear articles to be recycled.

8. The method according to claim 7, the source of thermoplastic material comprises footwear articles to be recycled having an upper comprising thermoplastic material LM and a sole based on thermoplastic material HM.

9. The method according to claim 6, wherein the source of filler comprises articles or components of articles to be recycled.

10. The method according to claim 1, wherein the source of filler comprises at least one textile material.

11. The method according to claim 10, wherein the textile material comprises yarns and/or fibers formed from at least two different materials.

12. The method according claim 10, wherein the inputs comprise between 10% and 30% by weight of textile material.

13. The method according to claim 1, wherein the source of filler comprises at least one latex, the inputs comprising between 10% and 25% by weight of latex.

14. The method according to claim 1, further comprising thermocompressing the ground mixture to the shape of the article.

15. The method according to claim 1, further comprising thermocompressing the ground mixture in the form of a plate, the article then being shaped by molding said plate.

16. The method according to claim 7, wherein the components of footwear articles to be recycled comprises soles of footwear articles.

17. The method according to claim 9, wherein the source of filler comprises one of a group including articles of clothing, footwear, and accessories comprising at least one filler material.

* * * * *